(12) United States Patent
Fadel et al.

(10) Patent No.: US 7,808,706 B2
(45) Date of Patent: Oct. 5, 2010

(54) LIGHT MANAGEMENT FILMS FOR DISPLAYS

(75) Inventors: Edward Fadel, Durham, NC (US);
Robert P. Freese, Chapel Hill, NC (US);
Richard N. Gardner, Raleigh, NC (US);
Michele E. Nuzum, Morrisville, NC (US); David L. Reed, Chapel Hill, NC (US); Thomas A. Rinehart, Durham, NC (US); Robert L. Wood, Apex, NC (US)

(73) Assignee: Tredegar Newco, Inc., Richmond, VA (US)

(*) Notice: Subject to any disclaimer, the term of this patent is extended or adjusted under 35 U.S.C. 154(b) by 0 days.

(21) Appl. No.: 11/053,998

(22) Filed: Feb. 9, 2005

(65) Prior Publication Data

US 2006/0061869 A1    Mar. 23, 2006

Related U.S. Application Data

(60) Provisional application No. 60/544,036, filed on Feb. 12, 2004, provisional application No. 60/544,018, filed on Feb. 12, 2004, provisional application No. 60/544,027, filed on Feb. 12, 2004, provisional application No. 60/544,026, filed on Feb. 12, 2004, provisional application No. 60/546,819, filed on Feb. 19, 2004, provisional application No. 60/545,875, filed on Feb. 19, 2004, provisional application No. 60/545,873, filed on Feb. 19, 2004, provisional application No. 60/551,560, filed on Mar. 9, 2004, provisional application No. 60/551,410, filed on Mar. 9, 2004, provisional application No. 60/551,403, filed on Mar. 9, 2004, provisional application No. 60/551,404, filed on Mar. 9, 2004, provisional application No. 60/613,445, filed on Sep. 27, 2004.

(51) Int. Cl.
*G02B 27/10* (2006.01)
*G02F 1/1335* (2006.01)
(52) U.S. Cl. .................................... 359/619; 349/95
(58) Field of Classification Search ............... 359/619; 349/95
See application file for complete search history.

(56) References Cited

U.S. PATENT DOCUMENTS

| | | | |
|---|---|---|---|
| 4,172,219 A | 10/1979 | Deml et al. | |
| 5,598,281 A * | 1/1997 | Zimmerman et al. | 349/5 |
| 6,400,431 B1 * | 6/2002 | Morio et al. | 349/95 |
| 6,788,460 B2 | 9/2004 | Knox et al. | |
| 6,816,306 B2 | 11/2004 | Freese et al. | |
| 6,816,313 B2 * | 11/2004 | Hara | 359/626 |
| 6,829,087 B2 | 12/2004 | Freese et al. | |
| 6,967,779 B2 | 11/2005 | Fadel et al. | |
| 2003/0206342 A1 | 11/2003 | Reed et al. | |
| 2005/0058947 A1 | 3/2005 | Rinehart et al. | |
| 2005/0058948 A1 | 3/2005 | Freese et al. | |
| 2005/0058949 A1 | 3/2005 | Wood et al. | |

* cited by examiner

*Primary Examiner*—Jack Dinh
(74) *Attorney, Agent, or Firm*—Myers Bigel Sibley & Sajovec, P.A.

(57) ABSTRACT

Microlens arrays include a substrate, an array of microlenses on a first side of the substrate and an aperture mask on a second side of the substrate. The aperture mask includes an array of apertures at optical axes of the lenses. A second array of apertures may be included in the aperture mask at randomized positions therein. The randomized apertures may be provided in the aperture mask by providing a diffusive layer between the aperture mask and the substrate, and directing coherent radiation through the lens array, the diffusive layer and aperture mask.

2 Claims, 18 Drawing Sheets

LIGHT MANAGEMENT FILMS FOR DISPLAYS

RELATED APPLICATIONS

This application claims the benefit of U.S. Provisional Application Ser. Nos. 60/544,036, filed Feb. 12, 2004, entitled Microlens Arrays With Aperture Masks Having Randomized Apertures and Methods of Fabricating Same; 60/544,018, filed Feb. 12, 2004, entitled Microlens Arrays With Aperture Masks Having Multiple Apertures Per Lens and Methods of Fabricating Same; 60/544,027, filed Feb. 12, 2004, entitled Microlens Arrays With Aperture Masks Having Varying Aperture Shapes and Methods of Fabricating Same; 60/544,026, filed Feb. 12, 2004, entitled Microlens Arrays With Aperture Masks Having Apertures That Include Diffusive Materials and Methods of Fabricating Same; 60/546,819, filed Feb. 19, 2004, entitled Microlens Arrays With Contrast Enhancing and/or Light Management Films for Use With LCD or Other Displays; 60/545,875, filed Feb. 19, 2004, entitled Retroreflectors Including Microlens Arrays and/or Optical Mask Layers, and Methods of Fabricating Retroreflectors; 60/545,873, filed Feb. 19, 2004, entitled Sieves and Moulds for Micron-Sized Particles and Methods of Using Same to Sieve and/or Mold Micron-Sized Particles; 60/551,560, filed Mar. 9, 2004, entitled Light Management Films for Backlit Displays and Methods of Making and Using Same; 60/551,410, filed Mar. 9, 2004, entitled Stampers for Micromolding Applications Including Photocurable Polymers, and Methods of Making and Using Same; 60/551,403, filed Mar. 9, 2004, entitled IR Laser Beam Locator and Profiles and Methods of Making and Using Same; 60/551,404, filed Mar. 9, 2004, entitled Anti-Glare Films With Anisotropic Light Dispersive Properties and Methods of Making and Using Same, and 60/613,445, filed Sep. 27, 2004, entitled Light Management Films for Backlit Displays and Methods of Making and Using Same. All of these applications are assigned to the assignee of the present application, the disclosure of all of which are hereby incorporated herein by reference in their entirety as if set forth fully herein.

FIELD OF THE INVENTION

This invention relates to microfabricating methods and systems, and more particularly to systems and methods for fabricating microstructures and microstructures fabricated thereby.

BACKGROUND OF THE INVENTION

Microlens arrays are used in applications where gathering light from a source and then directing it to various locations and in various angles is desirable. Such applications include computer displays, screens for projection televisions, and certain illumination devices. The utility of the array can often be enhanced by inclusion of an aperture mask which only permits light to pass through the array in certain directions and which absorbs ambient light which would otherwise reflect off of the surface of the array and degrade the effective contrast of the optical system. Such arrays and masks with apertures may be conventionally formed at the points at which the lenses focus paraxial radiation.

Conventional techniques for creating microlens arrays with aperture masks may involve fabrication of the arrays on suitable substrates which are or can be coated with appropriate radiation absorbing mask materials. High intensity radiation is then directed through the lenses and focused by them. If the structure of the lens array, substrate and mask has been designed so that the focal points of the lens array are at or near the mask layer, the radiation will form apertures in the mask at these focal points. See, for example, U.S. Pat. No. 4,172,219 to Deml et al., entitled Daylight Projection Screen and Method and Apparatus for Making the Same.

Microstructure arrays in optically transparent materials are used in applications where gathering light from a source and then directing it to various locations and in various angles may be desirable. When coated with reflective materials, such arrays can function as retroreflectors, reflecting light from a source back in the direction from which it entered the material.

Retroreflective materials have found a wide range of applications, particularly in signage and advertising in which clear visibility is desirable when illuminated at night. Additional applications include front projection screens. In many of these applications of retroreflective materials, for example road signs and markings, ease of manufacture and low cost may be desirable. The materials should also be easy to apply, weather-resistant and/or durable.

Particles of sizes ranging from about 10 microns-250 microns may be widely used in a range of chemical, biochemical, and/or pharmaceutical activities. For example, micron-sized spherical beads are used whose surfaces can provide sites for chemical reactions. Catalysis of chemical reactions can be promoted and controlled in this manner. Pharmaceutical delivery platforms can also be produced in this way.

The utility of these particles may depend on their availability in a monodispersed form. In monodispersed particles, the sizes of the particles should be accurately controlled so that, in turn, the surface area available for the reaction site is accurately known. Producing particles of a tightly controlled size and then sieving them to produce monodispersed collections may be time consuming and/or expensive.

Current techniques for forming micron sized particles from polymeric materials involve spraying or otherwise forcing the material in liquid form through a nozzle to form a stream and then breaking up this stream into particles using a variety of methods. Current methods for sieving the particles to obtain accurately monodispersed collections may be time consuming.

Certain types of displays, such as Liquid Crystal Displays (LCD) often use backlighting to achieve contrast and brightness levels for comfortable viewing. In applications such as laptop computers it may also be desirable to reduce overall power consumption.

Typically laptop computer displays are illuminated by small thin fluorescent tubes. The light from these tubes enters a wedge shaped piece of transparent plastic with reflective inclusions on its rear side, which acts as a light guide. Light which strikes the reflective inclusions bounces in various directions, some of it forward to the screen, some of it backward to a reflector behind the light guide, and bounces from there forward towards the screen and the remainder of the light goes in various other directions. Since the brightness of the fluorescent tube may be limited to reduce power consumption, the light that is not directed in useful directions should somehow be redirected towards the screen. Conventionally, light management films are placed between the light guide and the liquid crystal panel, which act to transmit light which is heading towards the panel and to reflect light which is traveling in other directions back towards the rear of the display stack. This light is then scattered by the reflective inclusions in the light guide and the transmission and reflection begin again, a type of "recycling" of light. Light which emerges from this light management film is directed towards the liquid crystal panel and emerges from the display at angles which are desirable for normal viewing.

The films that are conventionally used for such light management purposes are composed of films containing prismatic structures and which permit light incident on the films at certain angles to pass through while the remaining light is reflected by total internal reflection (TIR). The nature of the use of the films is such that it is generally desirable for the structures to be formed without seams or other joins or features which may interfere with the quality of the visible image.

Articles which contain large numbers of small shapes or structures are used in many applications from television and computer displays to microfluidics. For purposes of mass manufacturing, the small shapes or structures in these articles are conventionally produced first in a single "master" and then reproduced or replicated onto a "stamper" which contains negative images of the shapes on the master. The stamper can then be employed as a "tool" in web-to-web or similar replication process to reproduce the shapes on the original master over and over again. The quality of shapes or structures in each of the replicas may depend in large measure on the quality of the master and the stamper so that it is desirable for each stage in its production be carried out with precision.

Replication of the shapes on the master may involve embossing or otherwise pressing the master and the shapes thereon into a softer material. Once this material has hardened the master and the copy of it that have been made (the stamper) should be separated without damaging either. A similar process is carried out to make copies of the stamper. Conventionally, the stamper is pre-treated with some form of release agent to promote separation. Often this involves depositing a thin film of relatively inert inorganic or organic material onto the stamper prior to its use as a replication tool. In the replication of large stampers, this can be a difficult and time consuming process while errors in this process can significantly degrade overall production yields. Hence, it may be desirable to have masters which do not need to use such pre-treatment.

High powered Infrared (IR) Lasers can be particularly difficult and dangerous to use since the radiation beam is not visible. Apart from expensive and cumbersome solutions such as IR goggles, conventionally a material known as "burn paper" is used to identify the beam location. This paper, when exposed to the beam, will display a burned area or spot. Examination of the spot often reveals some level of detail about the spatial profile of the beam. Since it is not desirable that smoke or particles from the burn enter the atmosphere around the laser, potentially degrading optical components, the paper is normally held in a sealed plastic bag. It is desirable to have a more effective tool for locating IR laser beams and providing basic information regarding their spatial profile.

The image quality of many display devices can be degraded by the effects of ambient light reflecting from the display surface and interfering with the display image. In extreme cases, for example when viewing a computer display in daylight conditions, ambient light may completely "wash out" the image, rendering it unviewable. Anti-reflection coatings are available in certain instances, but these may be costly, may be difficult to apply to materials such as plastics, and/or may themselves interfere with image quality.

A second problem which may adversely affect the performance of displays is the inability to distribute the available light emerging from the display to the various points or spatial positions at which viewers may wish to use or view the display. Since it often desirable to conserve available light, designers may attempt to concentrate the intensity of the light emerging from the screen into areas where viewers are most likely to be found. The ability of a screen to so concentrate light is referred to as its gain. In applications such as televisions, the viewing area generally is not isotropically distributed with respect to the screen. Viewers are much more likely to be distributed at relatively high angles from the normal in the horizontal axis, while being distributed at much lower angles from the normal in the vertical axis. Diffusers which are isotropic thus, in effect, may waste a great deal of illumination by throwing it into positions where viewers are more unlikely to be found.

A third problem which may adversely affect screen performance is the presence of artifacts such as moiré patterns or other instances of aliasing, as well as speckle and related artifacts related to coherence phenomena. These problems, although subtle, may be pervasive and may account for an overall perception that images produced by a display lack clarity or sharpness.

SUMMARY OF THE INVENTION

Some embodiments of the present invention provide microlens arrays that include a substrate, an array of microlenses on a first side of the substrate and an aperture mask on a second side of the substrate. The aperture mask includes an array of apertures at optical axes of the lenses. A second array of apertures is also included in the aperture mask at randomized positions therein. The randomized apertures may be provided in the aperture mask by providing a diffusive layer between the aperture mask and the substrate, and directing coherent radiation through the lens array, diffusive layer and aperture mask. Theses embodiments are illustrated, for example, in FIGS. 1-3.

Microlens arrays according to some embodiments of the invention include a substrate, an array of microlenses on a first side of the substrate and an aperture mask on a second side of the substrate. The aperture mask includes a plurality of arrays of apertures at a plurality of predetermined angles relative to the optical axis of the lens. Microlens arrays may be fabricated according to some embodiments of the present invention by multiple exposures to coherent radiation at various angles, including parallel and nonparallel to the optical axes of the lenses in the array. These embodiments are illustrated, for example, in FIGS. 4-6.

Some embodiments of the present invention provide microlens arrays that include a substrate, an array of microlenses on a first side of the substrate and an aperture mask on a second side of the substrate. The aperture mask includes therein a plurality of elongated apertures. In some embodiments, the elongated apertures may be formed by overexposure to coherent radiation through the lenses. These embodiments are illustrated, for example, in FIGS. 7-9.

Some embodiments of the present invention provide microlens arrays that include a substrate, an array of microlenses on a first side of the substrate and an aperture mask on a second side of the substrate. The aperture mask includes a plurality of apertures therein. At least some of the apertures include diffusive material therein. The diffusive material may fill the apertures. Microlens arrays may be fabricated according to various embodiments of the present invention by imaging a black layer through a lens array to form apertures, and then coating the black layer with optically transparent diffusive material such that the material at least partially fills the apertures. At least some of the material on the surface of the black layer may be removed. These embodiments are illustrated, for example, in FIG. 10.

Some embodiments of the present invention provide microlens arrays that include a substrate, an array of microlenses on a first side of the substrate and an aperture mask on a second side of the substrate. The aperture mask includes an array of apertures at optical axes of the lenses. The lenses and apertures are configured to permit light emerging from an LCD or other display to pass through and be directed towards a viewer while rejecting ambient light incident on the screen. A high contrast image for the viewer may be provided thereby. These embodiments are illustrated, for example, in FIG. 11-12.

Some embodiments of the present invention provide retroreflectors that include microlens arrays optically coupled to a reflective layer while other embodiments of the present invention provide microstructure arrays that include a substrate, an array of microstructures, such as prisms, pyramids, and/or lenses, on a first side of the substrate and an aperture mask on a second side of the substrate as well as a reflective layer behind the aperture mask. The aperture mask includes an array of apertures along optical axes of the microstructures. Methods of fabricating retroreflectors also are provided. These embodiments are illustrated, for example, in FIGS. 13-15.

Some embodiments of the present invention use sheets of, for example, photopolymer plastic, in which appropriately sized shapes have been formed, which can act as sieves and/or moulds for forming and/or selecting micron-sized particles. In some embodiments, these sheets can be on the order of 1 sq m and thus may contain billions of features for forming and/or sieving particles. Monodispersed collections of particles may thereby be produced efficiently. These embodiments are illustrated, for example, in FIG. 16.

Some embodiments of the present invention provide optical films containing microlenses and/or other microstructures which refract and focus, which are coated with a reflective material in which apertures have been patterned. The apertures can permit light which is suitably refracted by the structures to pass through, while the remaining light is reflected backwards. These devices may be used as light management films for Liquid Crystal Displays (LCDs) or other flat panel displays, in some embodiments. These embodiments are illustrated, for example, in FIGS. 17 and 18.

Some embodiments of the invention provide stampers containing structures or shapes of sizes from about 1 µm to about 1000 µm in photocurable polymers. Stampers according to some embodiments of the invention need not use application of a release agent when used as a tool in the replication process. Methods of making stampers and using the stampers without a release agent are also provided. These embodiments are illustrated, for example, in FIG. 19.

Some embodiments of the invention provide a card-shaped plastic part or substrate on which microlenses have been formed and which has been coated with an optically black material on either or both sides. This card, when placed in the path of the beam, will indicate the location of the beam by means of a popping sound. The beam profile is registered in the form of areas where the black material has been removed to a greater or lesser extent by the laser radiation which focused onto the black layer. These embodiments are illustrated, for example, in FIGS. 20 and 21.

Some embodiments of the invention provide antiglare films that include a substrate, such as a film of optically transparent plastic, in which small grooves have been formed. In some embodiments, the precise position and size of these grooves may be random, and, in some embodiments, width ranges from about 0.1 micron to about 5 microns may be used. The grooves can be oriented to affect the properties of the film and/or the angles into which it distributes light. In some embodiments, the film may be laminated directly to the display screen. In other embodiments, it may be spaced so that there is a variation in the optical index of refraction between the plane where the image is formed and the film. This spacing may be provided for in many different ways, including the production of layers of film in materials of varying index and placing such layers in contact with a display screen. These embodiments are illustrated, for example, in FIGS. 22-24.

DETAILED DESCRIPTION

Figure 1:
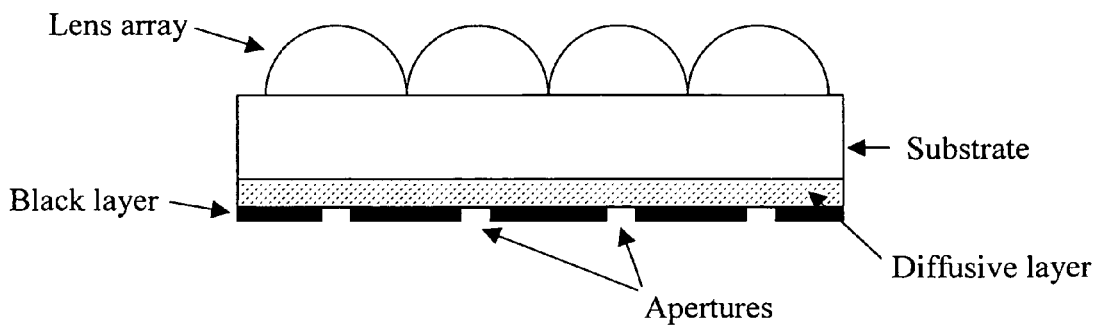
FIGS. 1-6 are cross-sectional views of various embodiments of the present invention.

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. In the drawings, the thickness of layers and regions are exaggerated for clarity. Like numbers refer to like elements throughout. As used herein the term "and/or" includes any and all combinations of one or more of the associated listed items and may be abbreviated as "/".

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, regions, steps, operations, elements, and/or components, but do not preclude the presence or addition of one or more other features, regions, steps, operations, elements, components, and/or groups thereof.

It will be understood that when an element such as a layer or region is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be understood that, although the terms first, second, etc. may be used herein to describe various elements, components, regions, layers and/or sections, these elements, materials, regions, layers and/or sections should not be limited by these terms. These terms are only used to distinguish one element, material, region, layer or section from another element, material, region, layer or section. Thus, a first element, material, region, layer or section discussed below could be termed a second element, material, region, layer or section without departing from the teachings of the present invention.

Furthermore, relative terms, such as "lower", "base", or "horizontal", and "upper", "top", or "vertical" may be used herein to describe one element's relationship to another element as illustrated in the Figures. It will be understood that relative terms are intended to encompass different orientations of the device in addition to the orientation depicted in the Figures. For example, if the device in the Figures is turned over, elements described as being on the "lower" side of other elements would then be oriented on "upper" sides of the other elements. The exemplary term "lower", can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below. Moreover, the terms "front" and "back" are used herein to describe opposing outward faces of a flat panel display. Conventionally, the viewing face is deemed the front, but the viewing face may also be deemed the back, depending on orientation.

Embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated, typically, may be rounded. Thus, the regions illustrated in the figures are schematic in nature and their shapes are not intended to illustrate the precise shape of a region and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Some embodiments of the present invention may arise from recognition that, in certain applications, it may not be necessary, or even desirable, to predetermine in a precise manner the positions or angles at which radiation emerges from the lens array and mask aperture combination. For example, when lens arrays are used in systems in which there are other regular arrays of light emitting or light transmitting elements, moiré patterns or other aliasing artifacts can appear. Randomization of the position of the apertures in the mask or the angles at which radiation is transmitted through the mask can reduce or ameliorate these problems.

Conventionally, diffusive elements can be included in optical films or screens to scatter the radiation in a broad cone of angles. However, to be effective in scattering the radiation, this diffusive material may be included in the bulk of the screen or film and thus may tend to degrade transmissivity and resolution. The result may be a hazy or fuzzy image.

Microlens arrays according to some embodiments of the invention comprise a substrate, such as a plastic substrate, on one side of which a lens array has been formed. On the other side of this substrate there is a thin layer of diffusive material (diffusive layer) followed by a black layer. The diffusive layer and the black layer are located at or near the focal plane of the lenses in the array. In some embodiments, apertures are formed in the black layer both at the optical axis of the lenses in the array and at other positions, randomly distributed throughout the black layer (FIG. 1). In other embodiments, only randomized apertures are formed.

Figure 2:
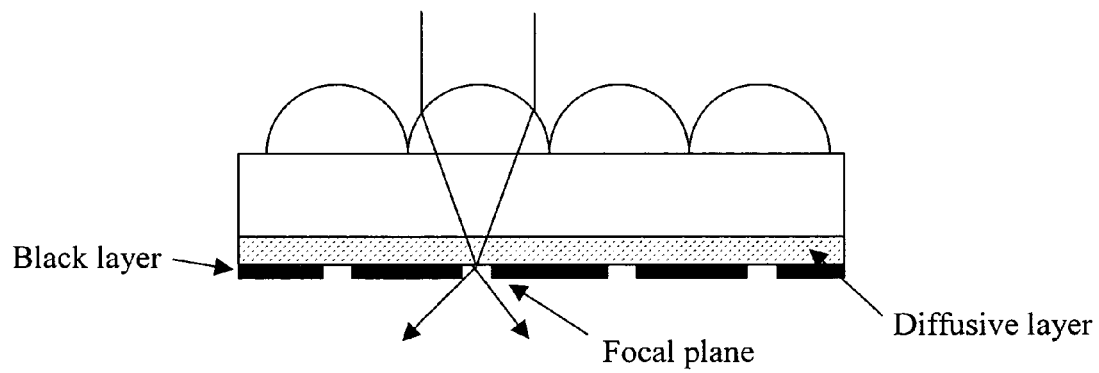

Methods of fabricating microlens arrays with aperture masks having randomized apertures, according to some embodiments of the present invention, now will be described. Lens arrays are fabricated on a substrate or display blank, which, in addition to a black layer also includes, beneath the black layer, a thin (e.g., 5-10 microns) diffusive layer. This layer is located near the focal plane of the lenses (FIG. 2). The layer can be formed prior to application of the black layer by including small amounts of optically transparent materials such as titanium dioxide and/or calcium carbonate in the formulation of the substrate itself, and/or by roughening the texture of a thin layer of the substrate. Apertures are then formed in the black layer by exposing the lens array to coherent radiation. When the lens array is irradiated by intense coherent light, this light is focused by the lenses through the apertures in the black layer. Most of it passes through the screen blank and emerges in a cone of angles determined by the lens array. Some of the light however is scattered by the particles in the diffusive layer and emerge from the screen blank at very high angles.

Figure 3:
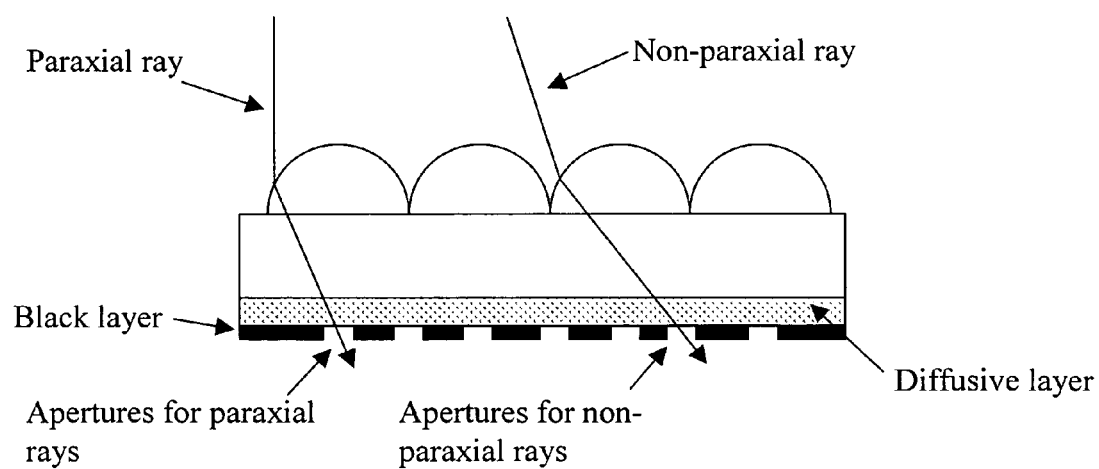

As a result, a multitude of apertures are created which are located at positions which enable non-paraxial light rays to emerge (FIG. 3). In some embodiments, the density of aperture formation may be related to the thickness and/or character in this thin diffusive layer, the wavelength of light used in the aperture creation process, the average size of the diffusive particles, the intensity of illumination used to create apertures by the described aperture creation process, and/or other factors.

Some embodiments of the invention may arise from recognition that it may be desirable to distribute a predetermined amount of light in certain directions which are outside of the cone of the typical viewer of the screen or display. This may be desirable, for example, to provide the information that the display is on or off to someone who is not viewing the display in the usual way. Other screen designs might be employed to provide screen visibility at two or more discrete locations or at two or more specific angles to the screen. For this purpose it may be necessary or desirable to determine with precision precisely where the light will go when it emerges from the screen Complex lens array designs, involving varying lens shapes over various areas of the screen can achieve this objective in principle. Unfortunately, this solution may be complex and may need a high degree of control over lens shape and/or position in a large array.

Figure 4:
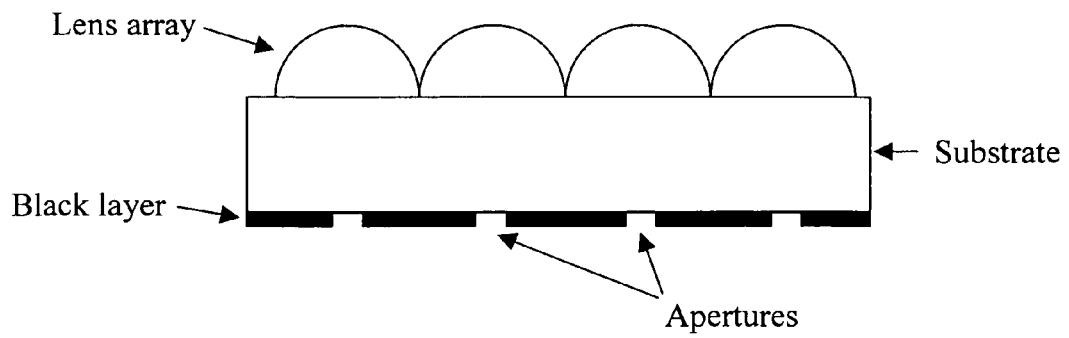

Microlens arrays according to some embodiments of the invention comprise a substrate, such as a plastic substrate, on one side of which a lens array has been formed. On the other side of the substrate there is a black layer in which apertures have been formed both at the optical axis of the lenses in the array and at other predetermined positions (FIG. 4). In some embodiments, one or more arrays are provided at one or more oblique angles to the optical axis of the lenses.

Figure 5:
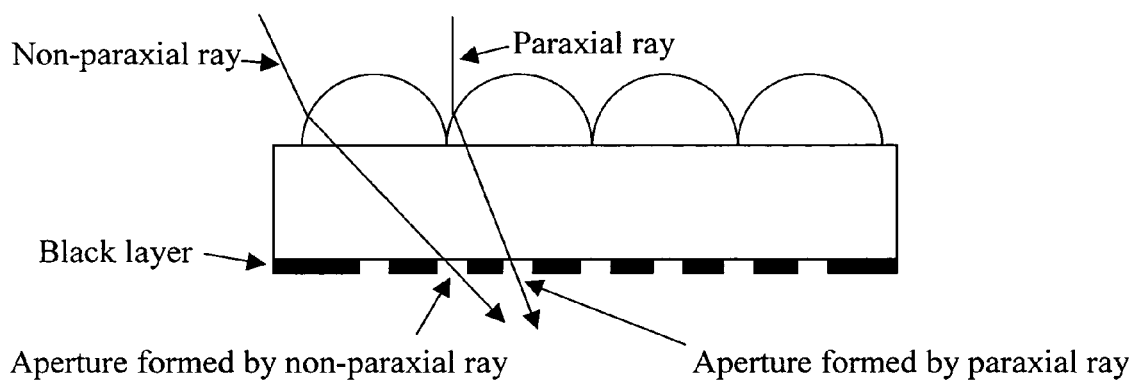

Methods of fabricating microlens arrays with multiple apertures per lens, according to some embodiments of the present invention, now will be described. Lens arrays are fabricated from a stamper on a substrate or display blank which includes a black layer on the side opposite from that in which the lens array is placed. The lens array is then exposed with coherent radiation directed along the optical axis of the lenses to form apertures. In addition to this exposure, as a prior, simultaneous and/or subsequent step, the array is exposed to similar coherent radiation but at angles which are not parallel to the optical axes of the lenses in the array (FIG. 5). The apertures thus formed will permit light to pass through the mask array at angles which depend on the index of refraction of the lens material, the optical design of the lenses, the wavelength of the radiation to which the array is exposed, and/or other factors.

Some embodiments of the present invention may arise from recognition that it may be necessary or desirable to control the cone of angles at which light is emitted from the screen or film. This cone may have as its axis the optical axis of the lenses in the array or it may have some other direction as its axis. It may also be desirable that this cone not be circular but rather have an elliptical or other elongated shape as its base. This may be particularly useful in applications where the viewers or viewing angles are distributed preferentially either horizontally or vertically with respect to the screen or film.

Conventionally, this type of result may be achieved by creation of anamorphic lenses in the array which have different profiles along, for example, the vertical and horizontal axes, and therefore direct incident light differently in these two directions. Alternatively, the distribution of light can be controlled by packing the lenses in the array differently along the vertical and horizontal axes. Lenses that are overlapped in the array, say along the horizontal axis, have their power to distribute light to high angles diminished. If the lenses are kept separate along the vertical axis then there will be differential distribution of the light in the two directions. Unfortunately, both of these solutions may be complex and/or require a high degree of control over the shape and placement of the lenses in the array.

Figure 7:
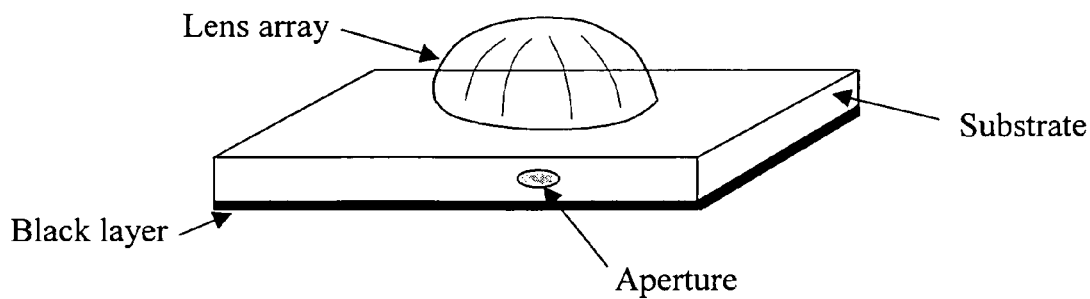
FIGS. 7-10 are perspective views of various embodiments of the present invention.

Microlens arrays according to some embodiments of the invention comprise a substrate, such as a plastic substrate, on one side of which a lens array having non-spherically symmetric lens shapes has been formed. On the other side of the substrate there is a black layer in which apertures have been formed which are elongated and/or in other ways take their shape from the optical properties of the lenses. (FIG. 7).

Methods of fabricating microlens arrays with varying geometric shapes, according to some embodiments of the present invention, now will be described. Lens arrays including non-spherically symmetric lenses are formed by a stamper on a substrate which includes a black layer on the other side. The lens array is then exposed with coherent radiation directed along the optical axis of the lenses to form apertures. These apertures are created through the overexposure characteristics of the aperture formation process when this lens array and black layer combination is subjected to radiation intensities greater than the saturation intensity.

Figure 8:
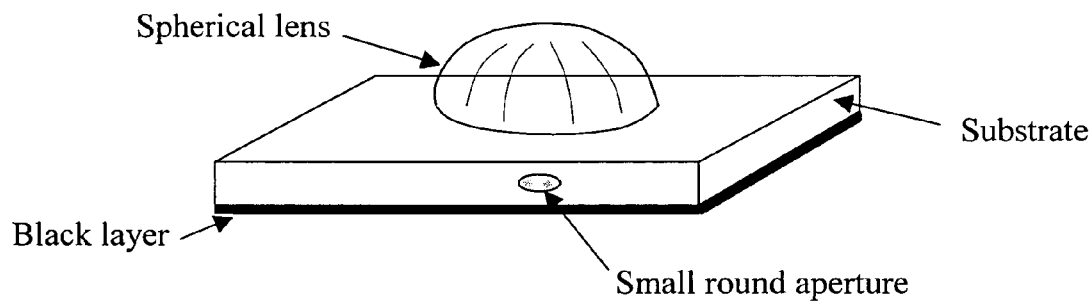
Figure 9:
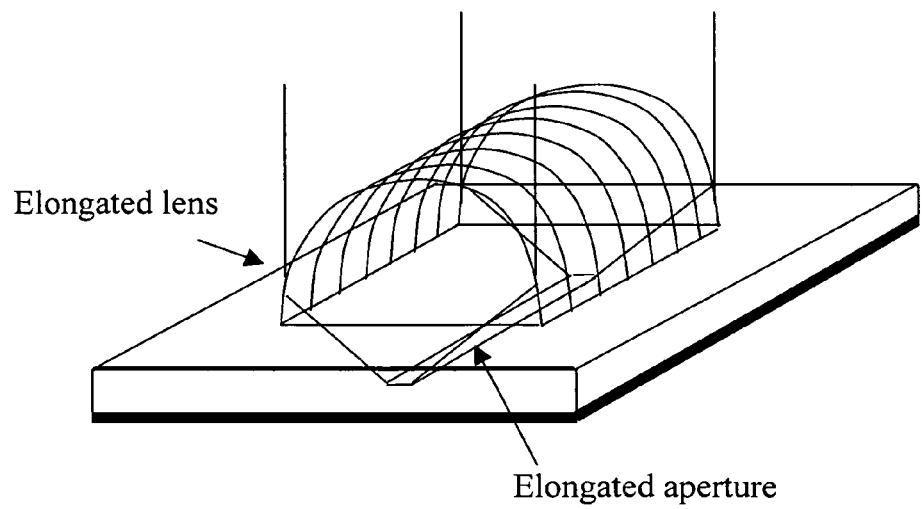

If the aperture creation process is carried out in the saturation region, defined as a region in the exposure/time curve where the incident power vs. time/energy is set so as just to open up apertures in the black layer and if the lens shapes are circularly symmetric, then small round apertures will be formed (FIG. 8). If the aperture creation process is carried out at a somewhat higher intensity of exposure to coherent radiation, and if the lenses themselves are elongated in one direction, then the combination of lens shapes and slight over exposure can enhance the effect of the aperture formation process and elongated apertures are formed (FIG. 9).

Some embodiments of the invention may arise from recognition that there may often be competing concerns in connection with the optical design of screens or films for displays or televisions. It may be desirable on the one hand, to display a bright image to viewers in front of the display and level with it while permitting some viewing of the screen from larger angles to the normal in either the horizontal or the vertical direction. To accomplish this, it also may be desirable to restrict the amount of light that emerges at angles which take it outside of the normal viewing positions, towards the ceiling or the floor, for example, in many consumer applications.

Lenses with larger radii of curvature may be well suited for providing a bright image to viewing angles at or near the normal, and in restricting light from emerging at angles which are not useful, but may exhibit a rapid decay of the amount of light available at moderate angles to the normal.

It is possible to design lens arrays with lens shapes and geometric configurations which address the issue of light distribution. Unfortunately, these designs may be rather delicate and/or may require a high degree of control over the production of the lens array.

It is also possible to include a diffusive layer on top of a black layer in which apertures have been formed at the optical axes of the lenses in the array. The diffusive layer can then act to scatter light emerging from the apertures. This diffusive layer, however, may degrade the ability of the black layer to reject ambient light and therefore may reduce the effective contrast of the display.

Figure 10:
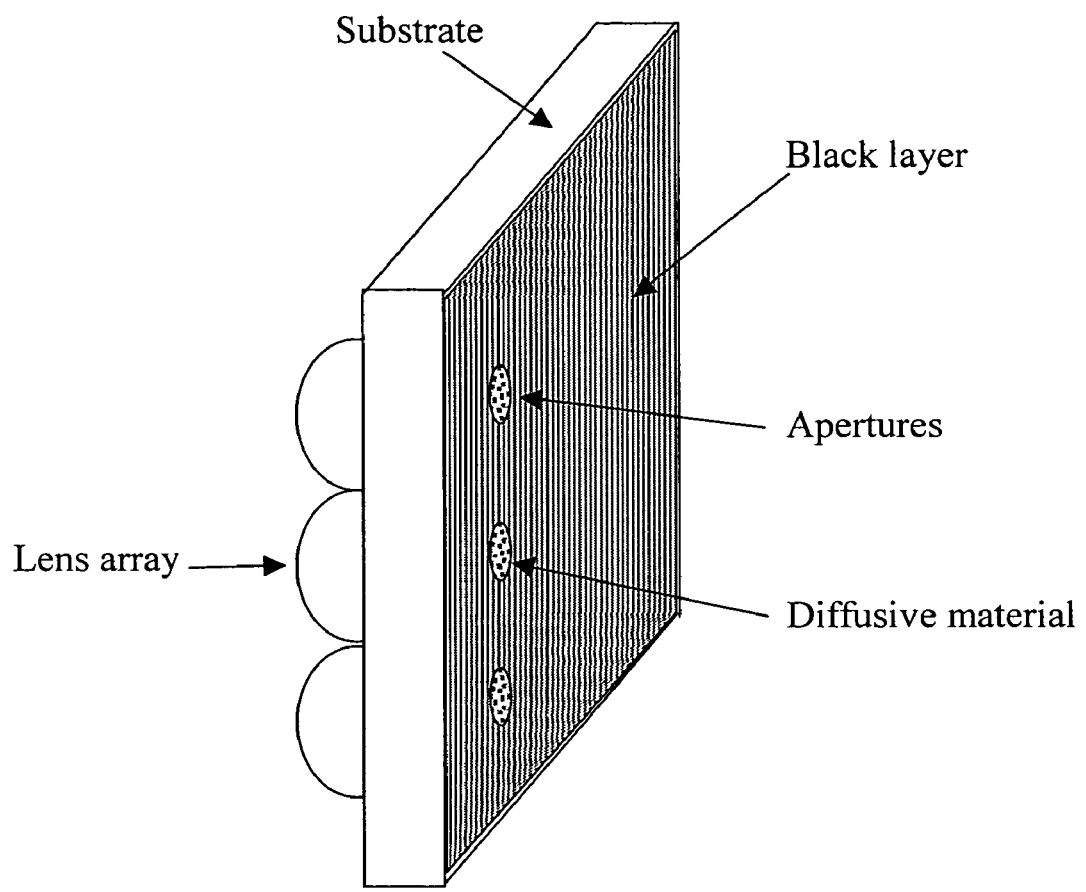

Microlens arrays according to some embodiments of the invention comprise a substrate, such as a plastic substrate, one side of which includes a lens array. On the other side of the substrate there is a black layer in which apertures have been formed at the optical axes of the lenses. These apertures include therein, or are filled with, a diffusive material (FIG. 10).

Methods of fabricating microlens arrays with apertures that include a diffusive material therein, according to some embodiments of the present invention, now will be described. Lens arrays are formed by a stamper on a substrate which includes a black layer on the other side. The lens array is then exposed with coherent radiation directed along the optical axis of the lenses to form apertures. Once these apertures are formed, optically transparent diffusive materials such as silicon dioxide, titanium dioxide, aluminum oxide, calcium carbonate, zinc oxide, various silicates and alumino-silicates, clays and/or combinations thereof can be applied. Given the relatively small size of the apertures and their high aspect ratio, material which enters the apertures will remain there while excess material can be removed using conventional techniques.

Some embodiments of the present invention may arise from recognition that, in certain applications, it is desirable to permit light emerging from certain portions of a display to pass to the viewer while reducing or preventing reflections which can decrease the visible contrast of the viewed image.

Displays employing Liquid Crystal Devices (LCD's) are becoming ubiquitous as ATM's, POS terminals, portable game players, PDA's and laptops have become an integral part of daily life. Since these devices are everywhere, they may often be used in circumstances in which ambient light degrades the display's visibility and where privacy issues may make it desirable to restrict the positions from which the information on the display can be seen. In many cases, the portable nature of the devices may also mean that available power is limited, so that solutions to these problems which use increased power consumption may not be desirable. Similar visibility problems may be present with other types of displays.

Currently technology is available to produce films which can reduce the range of angles at which light emerges from an LCD display. By concentrating the available light in a narrow cone of viewing angles, brightness may be increased and this may improve visibility in high ambient light. While this type of technology can be useful in certain applications, there is also a desire for technology which permits one to address the question of angle or position of viewing separately from questions of contrast or screen visibility.

Current technology may be limited to privacy screens and similar articles which can operate to limit the range of angles at which light is emitted from the screen and, depending on the technology employed, can serve to concentrate available light in a small angular cone. Commonly used privacy screens employ microstructures with prismatic shapes which are rendered partially reflective. Light incident on such films at desired angles passes through, while light emitted from the screen at undesirable angles is reflected back.

Since light which is polarized in the direction of the liquid crystal polymer filaments is preferentially transmitted through the LCD, an alternative approach is to use polarizing filters. Properly designed, such filters can reject some ambient glare but permit the light transmitted through the LCD to pass through. Unfortunately, both of these solutions may degrade the brightness of the display and it therefore may be desirable to have alternative approaches to enhancing LCD visibility.

Some embodiments of the invention comprise a substrate, such as a plastic substrate, one side of which includes a microlens array. The other side of the substrate is coated with a non-reflective, optically black layer at approximately the focal place of the lenses and in which apertures have been formed. The lenses in the array are placed so as to accept light emitted from an LCD and to focus such light through the apertures. See FIG. 11. Some embodiments of the present invention need not depend on the properties of polarized light and, therefore, are applicable to other types of display apart from LCD's.

Figure 12:
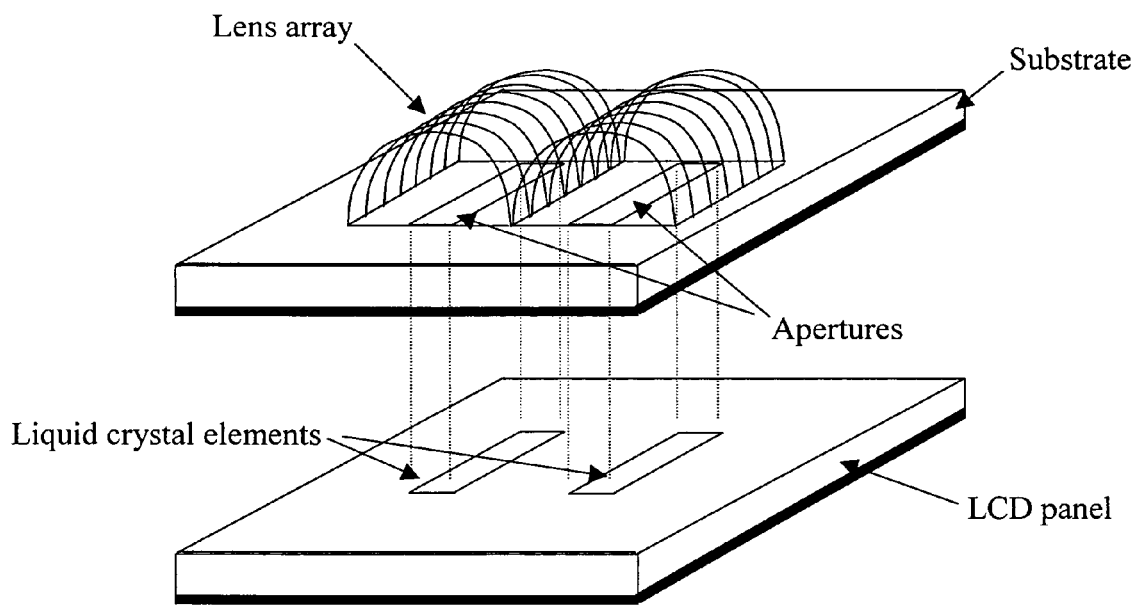
FIG. 12 is a perspective view of various embodiments of the present invention.

Methods of fabricating microlens arrays that are adapted for use in LCD Displays according to some embodiments of the invention now will be described. Lens arrays are fabricated on a substrate or display blank, which is coated with a black layer on the side opposite to the lens array. The thickness of the substrate is approximately equal to the focal length of the lenses. Apertures are then formed in the black layer by exposing the lens array to coherent radiation. The lenses are positioned so as to accept light from an LCD panel. For example, many laptop displays comprise LCD cells which are on the order of 70 microns in length and each pixel generally includes three cells. A microlens array for such a display may adopt a similar geometric pattern (FIG. 12). In many instances, it may also be desirable to restrict the angular cone in which light emerges from the display. In such cases, the design of the lenses in the lens array can take this into account and the lenses may not refract incoming light to high angles.

Figure 13:
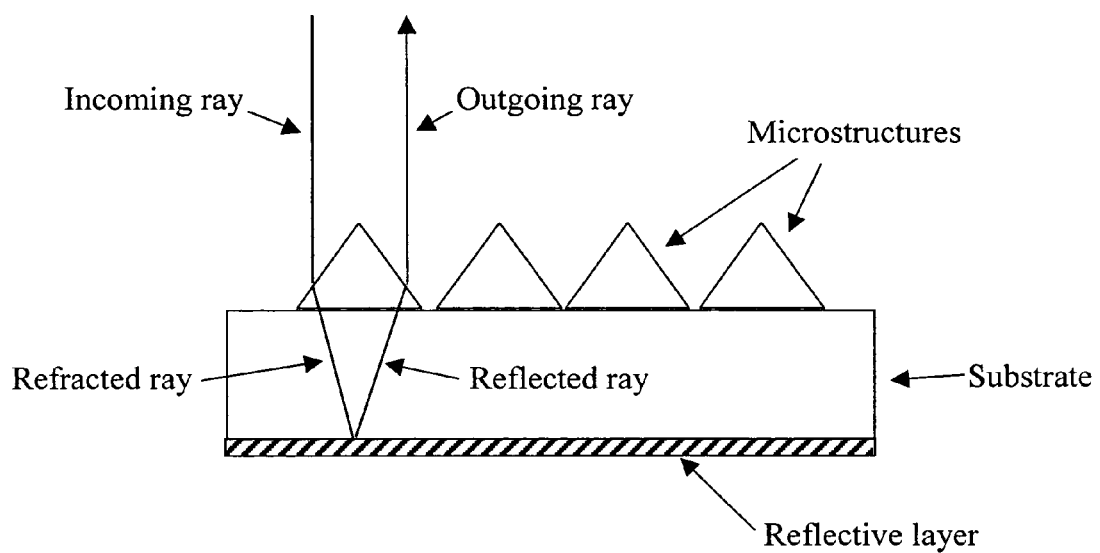
FIGS. 13-15 are cross-sectional views of various embodiments of the present invention.

Retroreflective materials are designed so that light incident upon them, within a certain range of angles, will largely be reflected back to its source rather than scattered off of the surface. Typically prismatic and pyramidal shapes are employed for this purpose, sometimes with small modifications to control the range of angles at which light is reflected from the material. These shapes may have dimensions on the order of 50 microns-100 microns (FIG. 13).

Conventionally, the shapes are originally formed on metal 'masters' using diamond turning or other mechanical means. The shapes on the metal "masters" are then transferred, first to "tools" and then the tools are used to emboss these shapes in plastic or are used as "stampers" in photopolymer replication processes. As a result of this sequence of steps, the shapes are disposed on a plastic substrate which is then coated so as to reflect light incident upon it. The geometry of the shapes (the so-called "active aperture") can control the amount of incident light is reflected back to its source.

Figure 14:
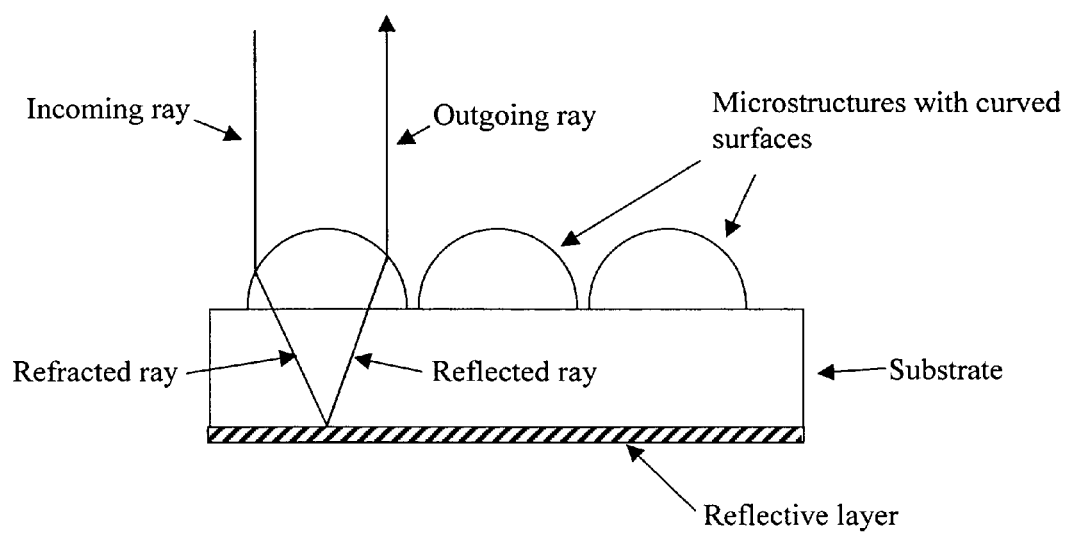

Some embodiments of the invention can modify these shapes to have one or more curved sides so that the range of angles at which light is reflected back from the material can be increased (FIG. 14). In general the diamond turning process may not be easily controlled to produce curved shapes and the diamond turning process may encounter difficulties in forming shapes with dimensions below 50 microns. The diamond turning process is also rather slow and may take many days to produce a master with shapes covering even a rather small area.

Another conventional approach to producing these materials uses glass beads pressed into an adhesive matrix and applied to a substrate. The beads act as lenses to focus the incident light and then reflect it back. The bead materials may be insensitive to orientation but, in general, may be somewhat less efficient at reflecting light back than the pyramidal shaped materials.

The new types of retroreflective materials described here comprise a transparent substrate on which an array of microstructures is deposited while the other side of the substrate is coated with a reflective material. If the optical properties of the microstuctures are correctly designed, light upon them is focused to a point at or near the reflective layer. The light will then be reflected back through the structure and to its source.

Microreflectors according to some embodiments of the present invention include an array of conventional prismatic and/or pyramidal shapes, that are fabricated as described in application Ser. No. 10/661,916 to Rinehart et al., entitled Systems And Methods for Fabricating Optical Microstructures Using a Cylindrical Platform and a Rastered Radiation Beam; application Ser. No. 10/661,917 to Freese et al., entitled Systems and Methods for Mastering Microstructures Through a Substrate Using Negative Photoresist and Microstructure Masters So Produced; and/or application Ser. No. 10/661,974 to Wood et al., entitled Systems and Methods for Fabricating Microstructures by Imaging a Radiation Sensitive Layer Sandwiched Between Outer Layers, and Microstructures Fabricated Thereby, all filed Sep. 11, 2003 and assigned to the assignee of the present invention, the disclosures of which are hereby incorporated herein by reference in their entirety as if set forth fully herein. Accordingly, masters for large arrays of pyramidal and/or prismatic microstructures may be fabricated in a feasible amount of time, to thereby allow high quality masters using prismatic and/or pyramidal shapes to be fabricated efficiently.

Other embodiments of the present invention may provide retroreflectors that use shapes other than prisms or pyramids, such as microlens arrays that were described in FIG. 14. These microlens arrays may provide one or more curved sides, so that the range of angles at which light is reflected back from a material can be increased, as shown in FIG. 14. Moreover, retroreflectors having microstructures with curved surfaces may be fabricated according to one or more of the above-cited patent applications, as was described above.

Finally, according to yet other embodiments of the present invention, which may be used in applications such as front projection screens, the substrate on which the microstructures are formed is coated on the other side with an optically black light absorbing layer. Apertures are formed in this black layer and then, behind the black layer, a reflective layer is provided. See FIG. 15.

Techniques for creating microlens arrays with aperture masks may involve fabrication of the arrays on suitable substrates which are or can be coated with appropriate radiation absorbing mask materials. High intensity radiation is then directed through the lenses and focused by them. If the structure of the lens array, substrate and mask has been designed so that the focal points of the lens array are at or near the mask layer, the radiation will form apertures in the mask at these focal points. See, for example, U.S. Pat. No. 4,172,219 to Deml et al., entitled Daylight Projection Screen and Method and Apparatus for Making the Same.

Figure 15:
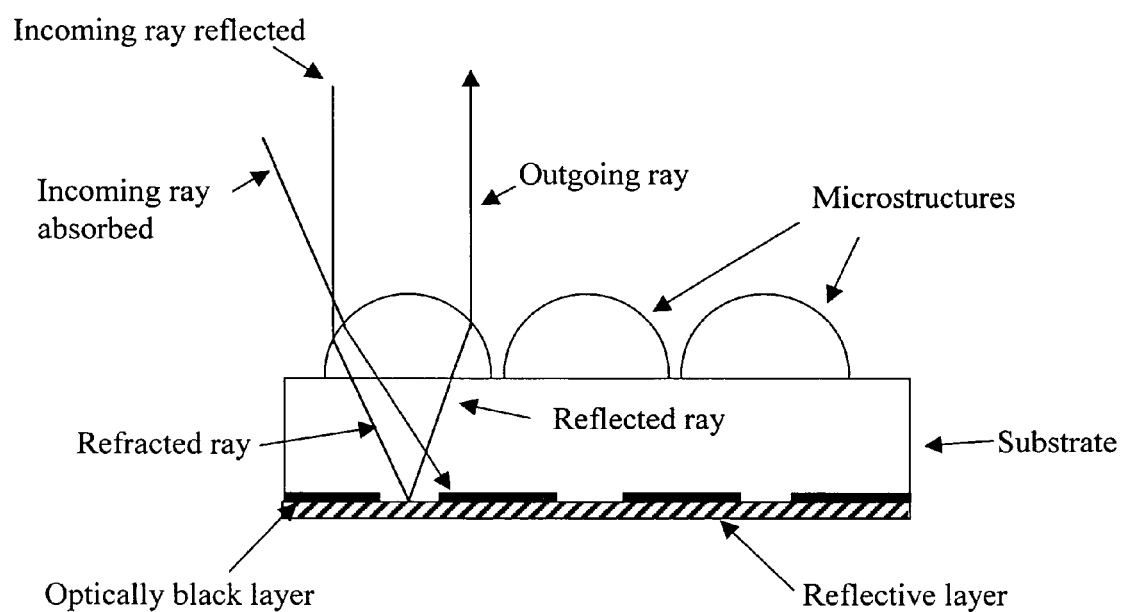

Retroreflective materials including an aperture-containing black layer can provide that light incident on the lenses which is focused to the apertures is reflected back, while substantially all other light is absorbed. This can allow the material the ability to select a cone of preferred directions from which to receive light and retroreflect it, as shown in FIG. 15.

Figure 16:
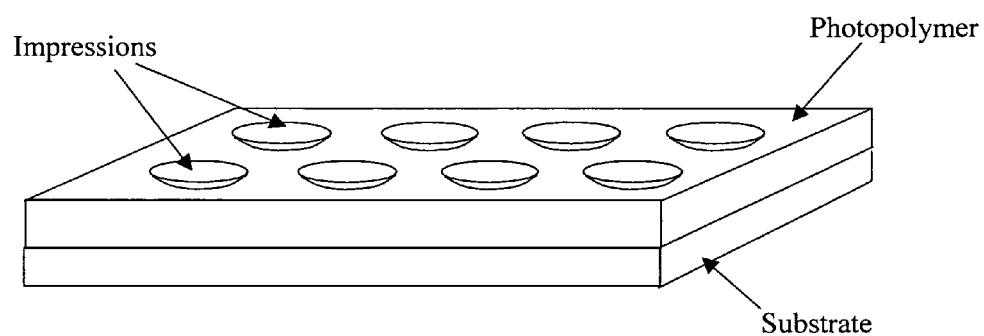
FIG. 16 is a perspective view of various embodiments of the present invention.

Moulds and sieves for producing and sorting micron-sized particles according to some embodiments of the invention comprise sheets of, for example, photopolymer plastic, transparent to ultraviolet light, in which small impressions of the desired size and shape have been formed by a microreplication and/or other process adapted to produce multiple small shapes accurately over a large area. These sheets may be coated with a thin layer of gold or other metallic or organic material to facilitate release of the particles from the shapes (FIG. 16).

To form particles, a material such as photopolymer resin material is applied to the mould so as to fill the impressions and accurately take on the shapes thereof. In certain embodiments, the mould may include two pieces which are aligned, one on top of the other, to create the shapes. Once the resin has taken on the desired shapes, it is exposed to ultraviolet radiation and cured. The shapes can then be removed from the mould.

According to other embodiments of the invention, a sieve may be formed similarly from, for example, photopolymer plastic with impressions of suitable size and shape formed in it. Particles are then spread and/or poured over the sieve. Particles whose size is larger than the impressions will run off of the sieve and the remaining particles will enter the impressions and be held there by electrostatic force. These particles can then be released from the sieve and spread on another sieve whose impressions are slightly smaller in size. Any particles which are held in the first sieve but not in the second may thus be known to be of a size between the size of the larger impressions and the size of the smaller ones.

It will be clear from the above description that that the ability to produce moulds and sieves for micron sized particles may depend on the ability to produce small impressions accurately over a large area of photopolymer plastic and/or other material. Billions of impressions may be needed, each of which may have a complex shape and the positions of which may need to be accurately disposed on the part. Methods that produce fewer than 3,000 such impressions per second may be infeasible. Large numbers of impressions may be produced accurately over a large area in a reasonable time frame, as described in application Ser. No. 10/661,916 to Rinehart et al., entitled Systems And Methods for Fabricating Optical Microstructures Using a Cylindrical Platform and a Rastered Radiation Beam; application Ser. No. 10/661,917 to Freese et al., entitled Systems and Methods for Mastering Microstructures Through a Substrate Using Negative Photoresist and Microstructure Masters So Produced; and/or application Ser. No. 10/661,974 to Wood et al., entitled Systems and Methods for Fabricating Microstructures by Imaging a Radiation Sensitive Layer Sandwiched Between Outer Layers, and Microstructures Fabricated Thereby, all filed Sep. 11, 2003 and assigned to the assignee of the present invention, the disclosures of which are hereby incorporated herein by reference in their entirety as if set forth fully herein.

Some embodiments of the present invention provide light management films for LCDs. In some embodiments, an optically transparent substrate, such as a plastic substrate, includes an optically reflective layer on one side and microlenses and/or other microstructures on the other side. In some embodiments, the size of the structures should be no larger than the individual cells in the liquid crystal panel to be illuminated. In some embodiments, they may be no larger than 70 microns, and can be made smaller than this in other embodiments. Apertures are patterned in the reflective layer. See FIG. 17.

Figure 17:
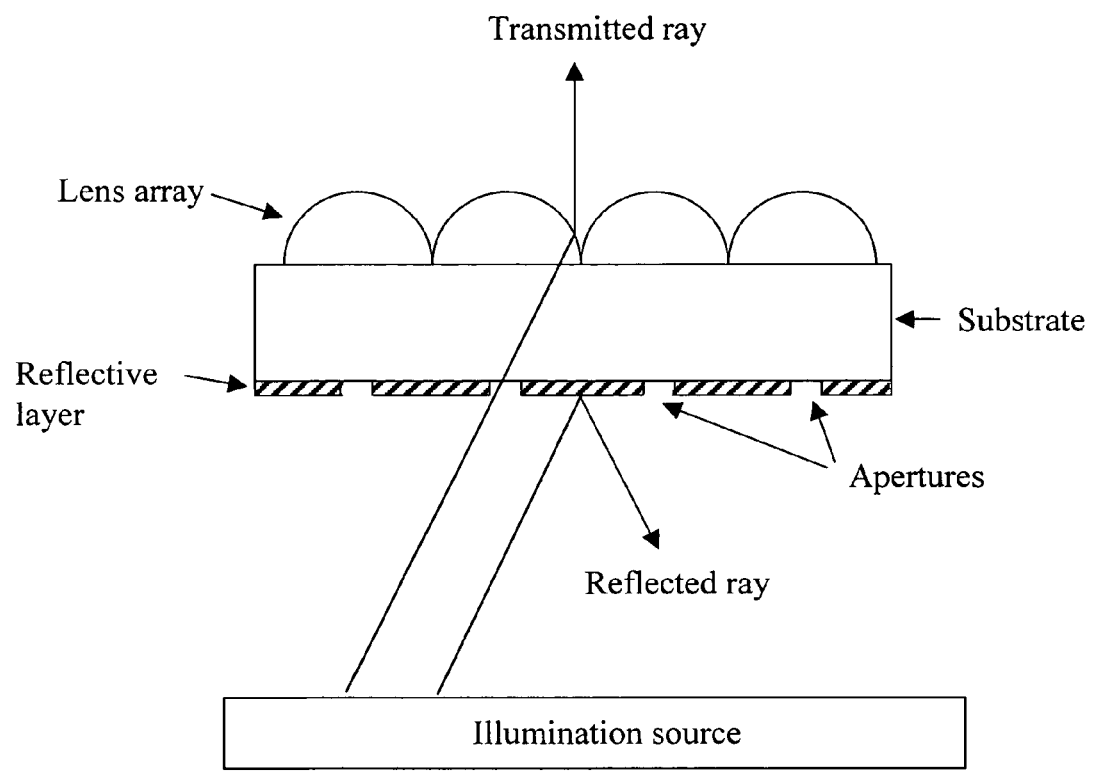
FIGS. 17-19C are cross-sectional views of various embodiments of the present invention.

The microstructures may be designed to refract light so that light rays incident on the film at appropriate angles are refracted towards the viewer at desirable angles. Other light, and in some embodiments, all other light, is reflected backwards towards the rear of the display (FIG. 17). By varying the refractive power of the microstructures and/or the thickness of the substrate one can vary the range of angles at which light emerges from the display to provide wider or narrower viewing angles. In some embodiments, one can also independently control the range of angles in the vertical and horizontal axes, to concentrate available light into a narrower viewing cone.

Figure 18:
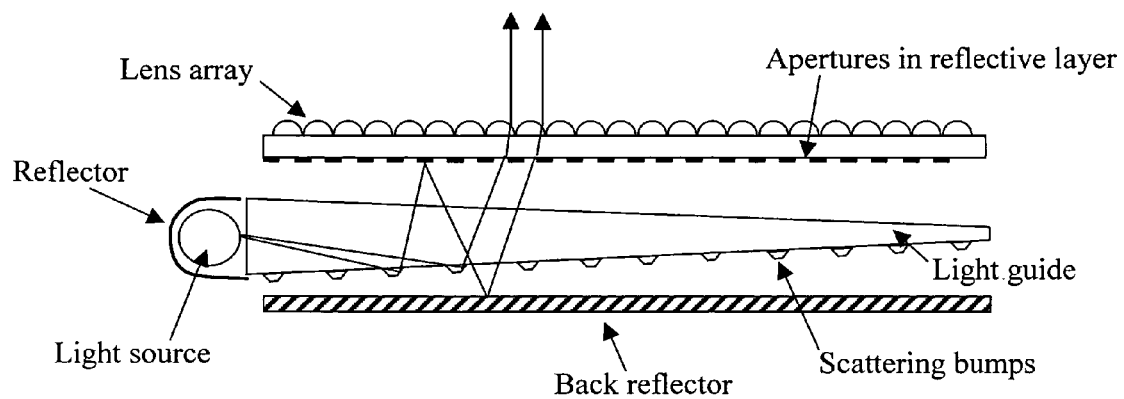

FIG. 18 is cross-sectional views illustrating an LCD light source according to some embodiments of the present invention. The light source, wedge-shaped light tunnel, back reflector and light management film, including a substrate, microstructures and reflective layers with apertures, are shown.

Figure 19A:
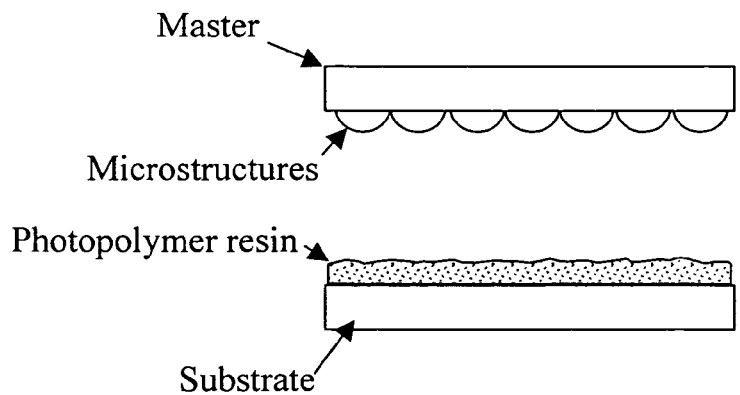
Figure 19B:
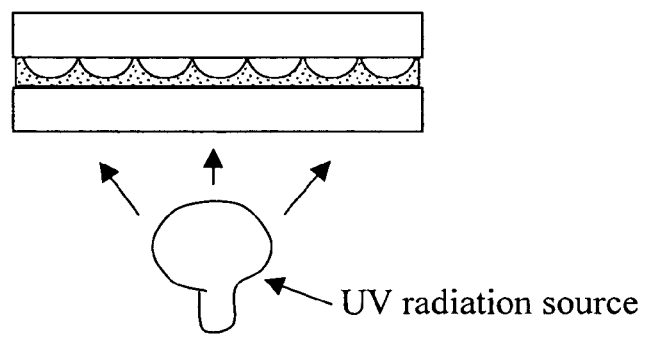
Figure 19C:
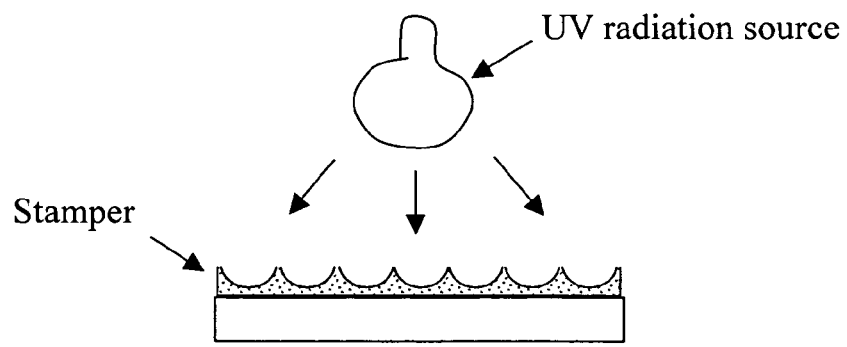

Stampers according to some embodiments of the present invention comprise plastic or other sheets coated with polymer resin which is curable upon exposure to radiation such as ultraviolet radiation. Examples of the polymer resins include Penta-erythritrol Tetra-acrylate, 2-Hydroxy-ethylacrylate, Dipenta-erythritrol Penta-acrylate. Shapes are produced in the resin when placed in contact with a master (FIG. 19A) and these shapes are then hardened by exposure to ultraviolet radiation (FIG. 19B) and the master is separated from the newly formed "stamper." The shapes thus produced are negative images of the shapes on the master. These stampers are then re-exposed to ultraviolet radiation (FIG. 19C). In some embodiments, this second exposure may involve dosages of from 2× to 5× the dosage to cure the photopolymer, depending on the precise nature of the material and thickness. This further exposure can further reduce the surface energy of the cured photopolymer resin and can reduce its tendency to bond with itself.

The stampers can now be placed in contact with plastic sheets coated with similar polymer resin, shapes formed and hardened and the two sheets separated. The newly formed shapes are now positive images of the shapes on the master. A release agent need not be used.

Figure 20:
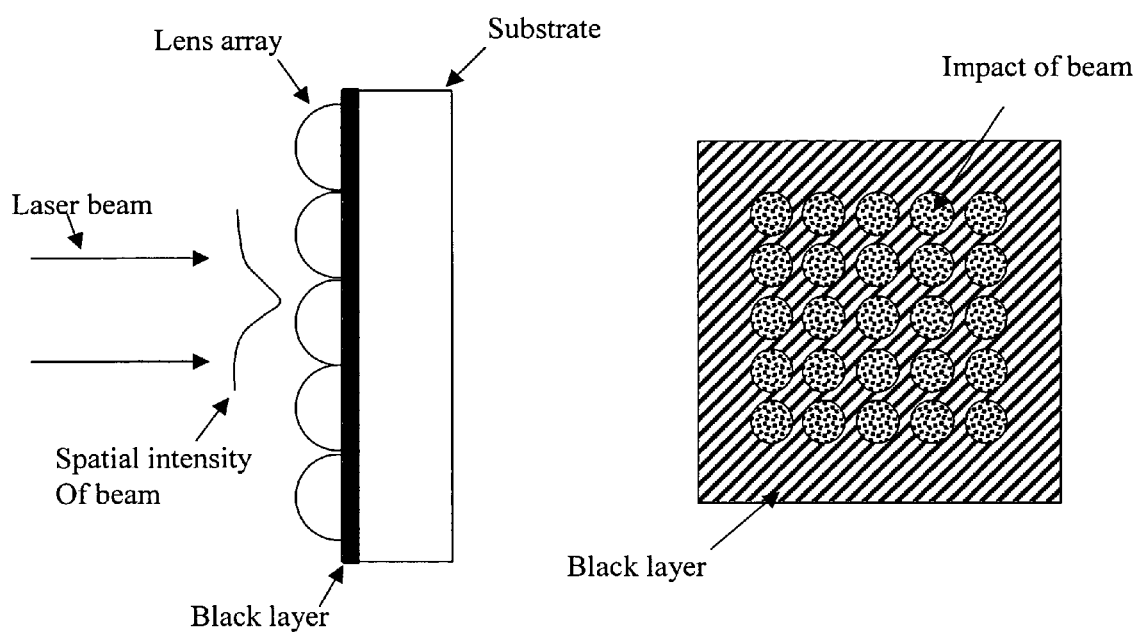
FIG. 20 is a cross-sectional and plan view of various embodiments of the present invention.
Figure 21:
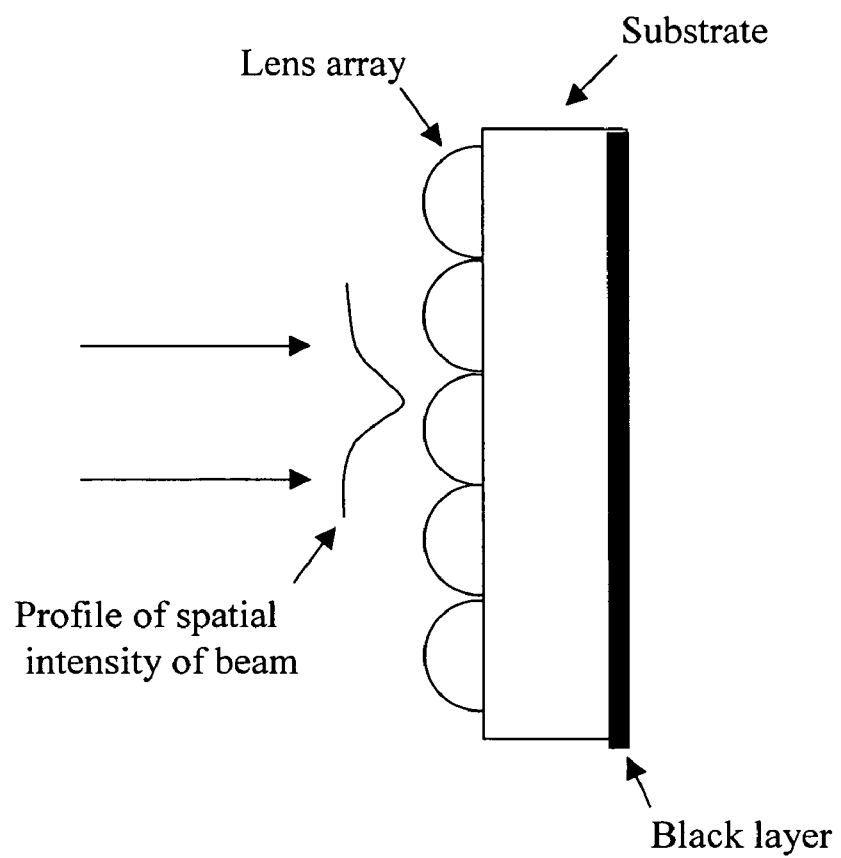
FIG. 21 is a cross-sectional view of various embodiments of the present invention.

Some embodiments of the invention comprise a substrate, such as a plastic substrate coated with an optically black layer and on which a microlens array has been placed. The thickness of the plastic substrate and/or the focal length of the lens array are arranged so that the lenses focus infrared radiation onto the black layer (FIG. 20). The black layer may be placed so that the lenses are replicated over it (FIG. 20) or it may be placed on the other side of the substrate (FIG. 21).

Figure 22:
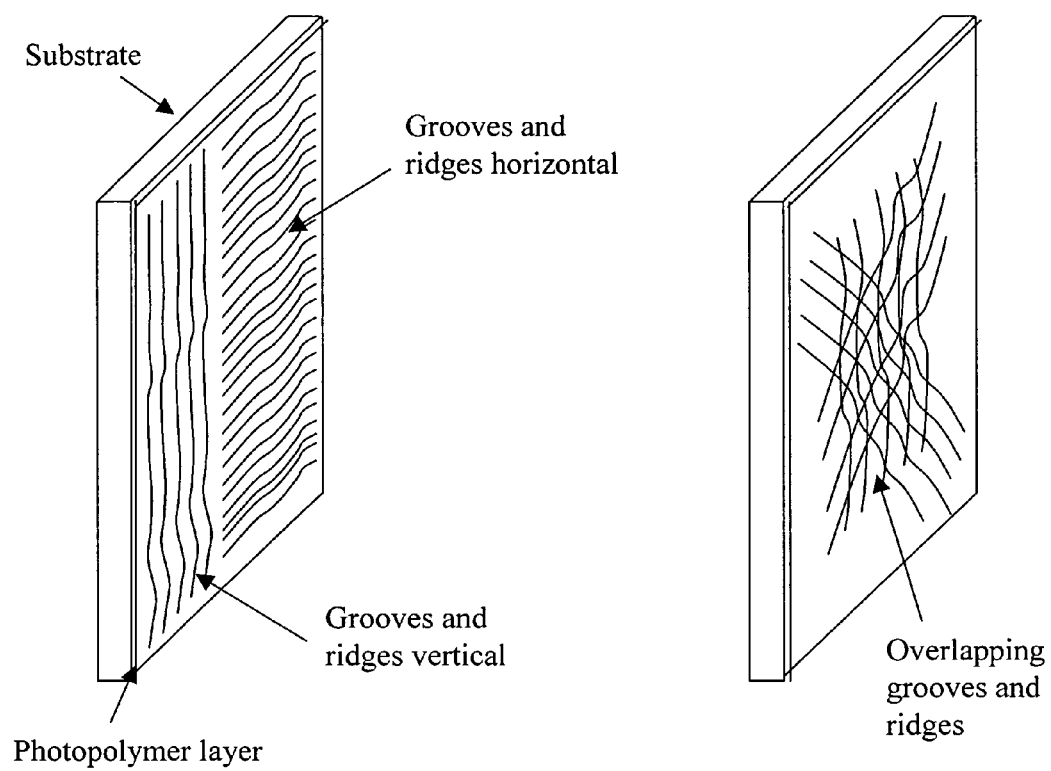
FIGS. 22-24 are perspective views of various embodiments of the present invention.

Some embodiments of the invention make use of surface micro-texturing which can form a randomized series of parallel grooves or ridges in the surface. These grooves or ridges may have more than one size vertically and/or horizontally. In some embodiments, they are generally smaller than can be resolved with the unaided eye. In other embodiments, they are within the range of about 0.1 μm to about 5 μm. All grooves/ridges may be aligned only in one direction and parallel, or there may be a series of grooves/ridges aligned in one axis and additional grooves/ridges aligned in different axis. Multiple sets of grooves/ridges may overlap at different angles to achieve a specific optical result (FIG. 22).

Figure 23:
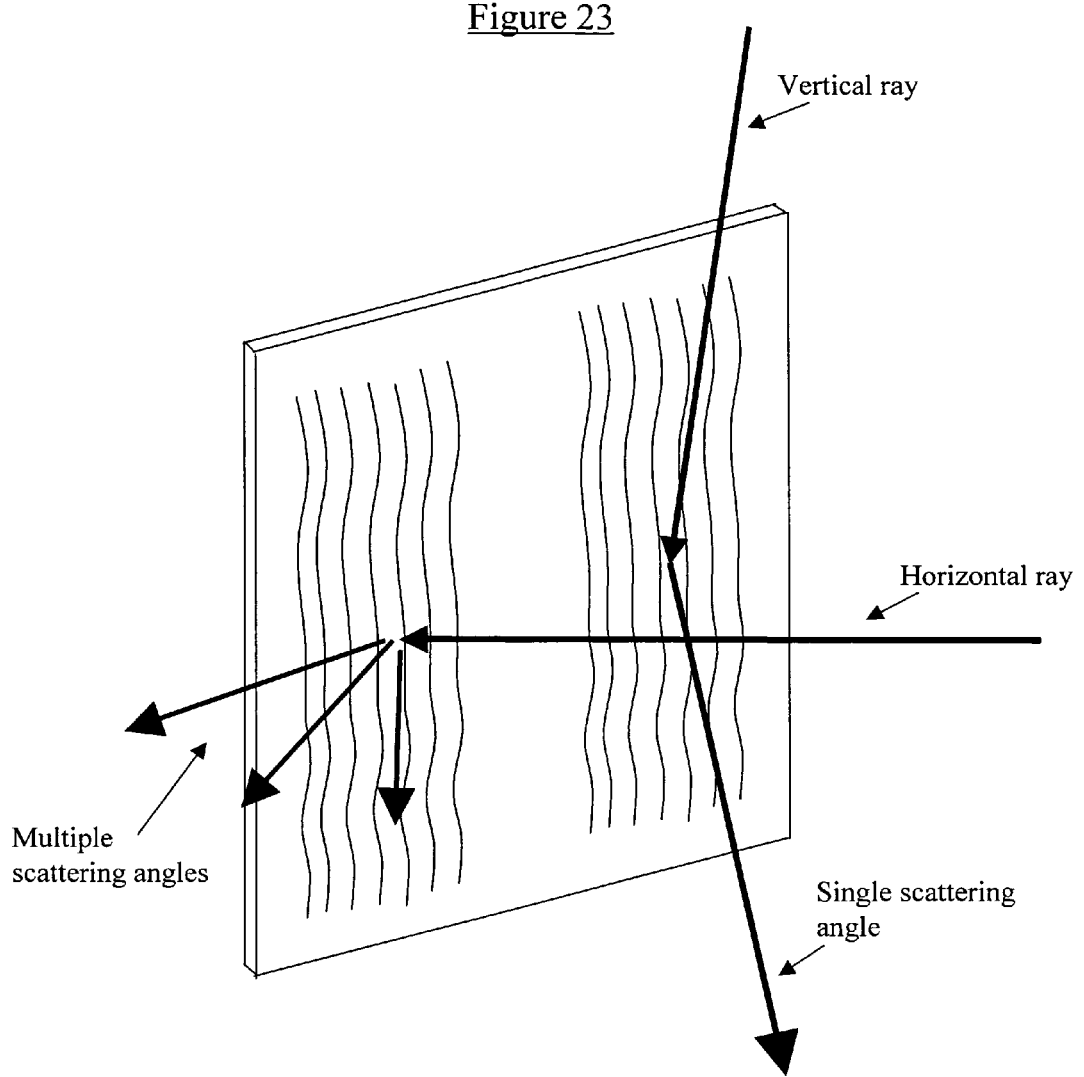

Microscopic grooves/ridges may act on light incident from either side of the screen surface. For example, ambient light incident from the viewing side of the screen may be reflected and scattered by the grooves/ridges. The direction of reflected and scattered light may be determined by the orientation of the grooves/ridges relative to the incident light. Ambient light falling at near-normal incidence on a screen with vertically oriented grooves/ridges generally will be reflected and scattered into a wide range of horizontal angles, while little may be reflected into vertical angles. Spreading this light into a large horizontal angle can reduce the intensity of light traveling back toward the source. Similarly, ambient light incident from sources to the side of the screen (e.g. a window) is scattered into a large horizontal range of angles. Since only one of these angles will coincide with a particular viewer, the intensity of this light can be greatly attenuated compared with specularly reflected light that might otherwise be coincident with that viewer. This can have the beneficial effect of reducing the amount of ambient light that would otherwise be reflected back to all viewers, who will typically be situated at a near-normal viewing angle (FIG. 23).

As the angle of incidence becomes closer to being parallel to the grooves/ridges, the surface becomes more specular, i.e. light reflection dominates over scattering. Consequently, ambient light arriving from above or below a screen with vertically-oriented grooves/ridges may be reflected with little or no dispersion toward the viewer (FIG. 23), and can be predominantly reflected toward areas that are inappropriate for viewing (e.g. the ceiling and floor). The ability to selectively control ambient light rejection in both axes can thereby provide better anti-glare properties compared with conventional isotropic anti-glare coatings.

Light incident on the screen from the projection side (opposite the viewer) also may be affected by the grooves/ridges. In this case, a portion of the incident light may be refracted by the grooves/ridges, while the rest of the light may be transmitted without any change in angle. Refracted light may be dispersed into a plane that is perpendicular to a plane defined by the optical axis and the groove/ridge axis. Thus, for grooves/ridges oriented vertically on a screen, a portion of incident light may be refracted into a range of horizontal angles.

Figure 24:
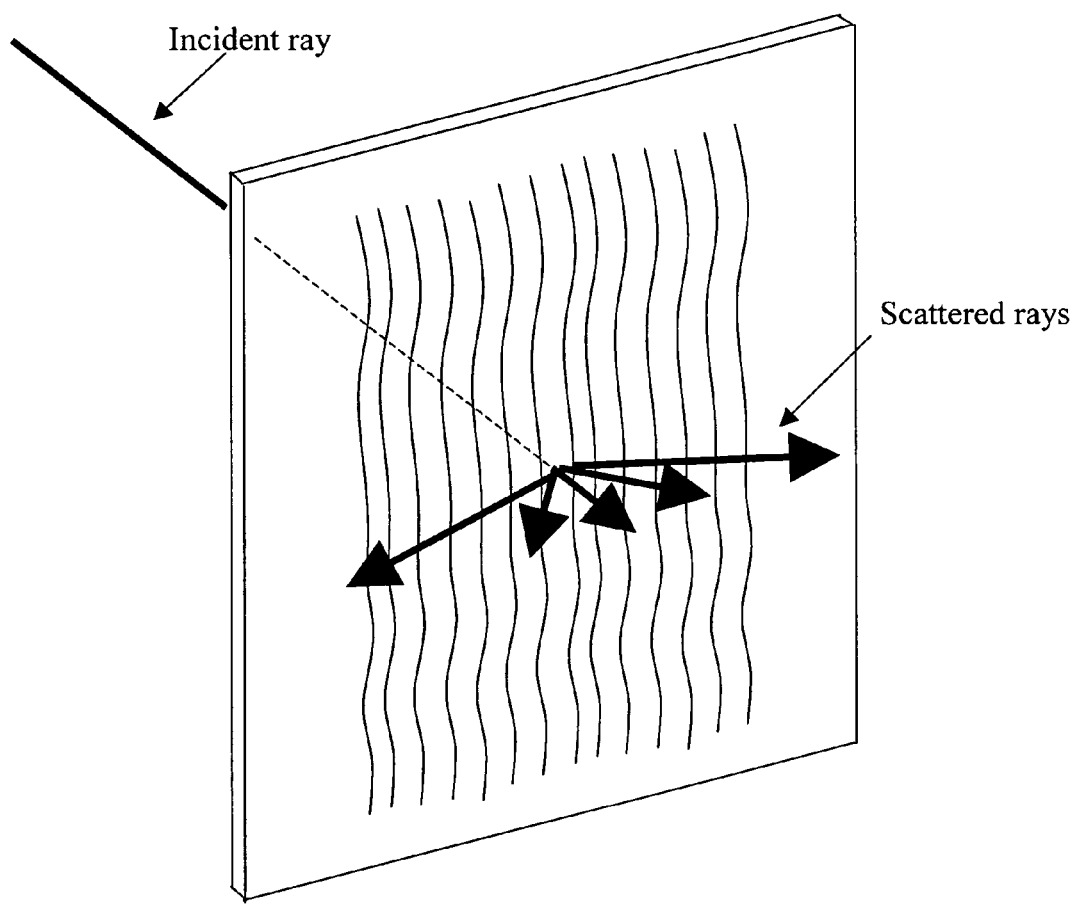

This property may be exploited for modification of screen gain. When coupled with a high-gain conventional or microdisplay screen, the grooves/ridges can disperse a portion of the forward light (parallel to the viewing axis) into horizontal viewing angles that are wider than what the display screen alone would produce. This can make the screen much brighter at angles well to the side of the normal viewing axis. Since the dispersion may be confined to a plane, rather than being directed into a solid angle, the illumination can be efficiently dispersed into the horizontal with little lost by throwing light into directions with large angles to the normal along the vertical axis (FIG. 24). This can provide a potential advantage over conventional approaches that use isotropic diffusers to increase screen visibility off-axis. Such diffusers may scatter light in all directions (i.e. into a solid angle), including those that are inappropriate for viewing. This may have a disadvantage that more forward light must be redirected to make the screen visible at the side. Anisotropic diffusers according to some embodiments of the invention therefore can potentially provide a brighter on-axis image while still being viewable at the side.

The modification of screen gain may be more efficiently produced when the film is spaced so that there is a change in index of refraction between the screen and the film. This can be produced by establishing an air gap and/or by producing layers of the film in materials of varying index.

Providing a series of parallel ridges and/or grooves on the surface of a planar display also may have the effect of improving the visual appearance of the screen. Without such structures, the underlying microstructures provided for control of screen gain may produce visible artifacts such as stripes, speckle, and/or moiré patterns. The random nature of the ridges/grooves can mask many of these visual artifacts and can generally provide a more uniform appearance to the screen.

EXAMPLES

The following Examples shall be regarded as merely illustrative and shall not be construed as limiting the invention.

Example 1

A plastic web stock was coated with both the diffusive layer and black layer. A lens array was formed on the web stock using a stamper. The lens arrays were then irradiated with coherent radiation to create self-aligned apertures. This exposure additionally created other apertures related to the thickness of the dispersion layer and the size and character of the apertures were directly related to this film thickness and power incident on the surface. Incident power ranged from 250 to 450 mJ. This example is illustrated in FIGS. 1-3.

Example 2

Figure 6:
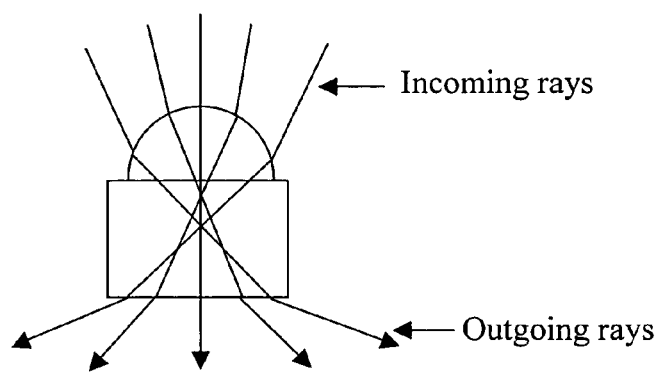

Plastic web stock was coated with a black layer. A lens array was formed on this web stock from a stamper. The lens arrays were the irradiated with coherent radiation at angles both of normal incidence and at 15 and 30 degrees off of normal in both directions (FIG. 6). The result was the creation of 5 distinct apertures per lens with the only visible light observed in a microscope objective being that light incident and directed in the same direction as the exposed light ray example.

The above example was further repeated with 3 incident laser light beams, one normal and two at +/−30 degrees incident angles. Again the result was the formation of distinct apertures which accumulated light in the direction of aperture creation. This example is illustrated in FIGS. 4-6.

Example 3

Samples were created to display elongated apertures in front of elongated lens shapes. These elongated apertures exhibited both an increased transmissivity and an increase in viewing angle, up to 20 degrees in the test samples. The above light control examples were created in a plastic web stock coated with a black layer on one side and on the other side of which a lens array was replicated off of a stamper. The exposure with a laser created self-aligned apertures and the shape of the aperture was further elongated by increase intensity of the exposure to the laser beam and at exposure intensities of 350 to 400 mJ. This example is illustrated in FIGS. 7-9.

Example 4

Plastic web stock was coated with a black layer. A lens array was fabricated on the web stock from a stamper and the lens array was irradiated with coherent radiation to produce apertures in the black layer at the optical axis of the lenses. Dispersive material was then applied to the black layer in liquid form and the excess removed. This example is illustrated in FIG. 10.

Example 5

Figure 11:
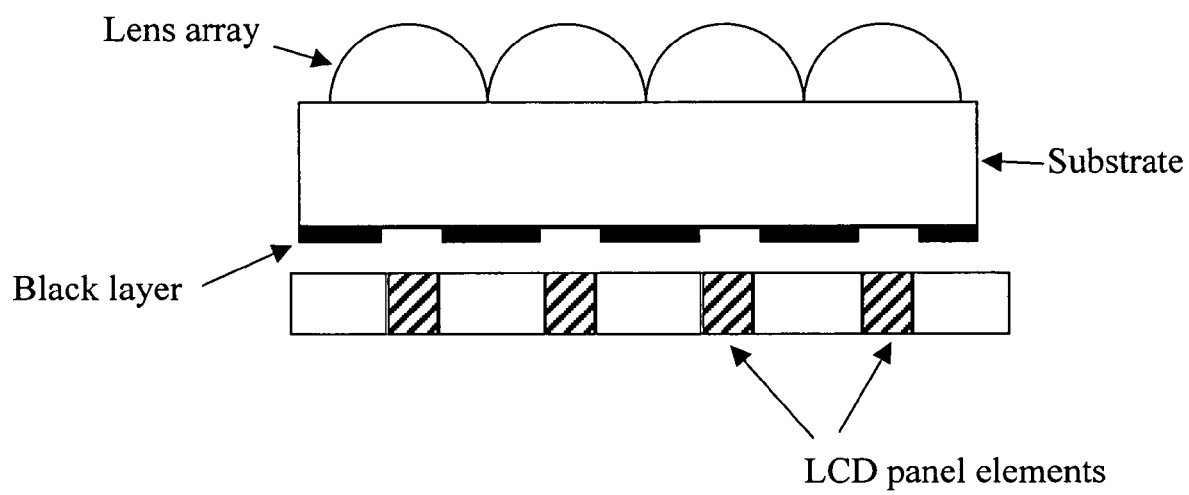
FIG. 11 is a cross-sectional view of various embodiments of the present invention.

Plastic web stock was coated with an optically black light absorbing black layer. A lens array was formed on the web stock using a stamper with dimensions that correspond to the emissions of an LCD panel. The lens arrays were then irradiated with coherent radiation to create self aligned apertures. Incident power ranged from 250 to 450 mJ. This example is illustrated in FIGS. 11-12.

Example 6

Retroreflective materials have been produced by beginning with a substrate stock which may be of one of two types, either (i) coated with an optically reflective layer on one side or (ii) coated with an optically black light absorbing layer on one side. A microlens array is then placed on the uncoated side of the stock through microreplication using a stamper to make the desired shapes in photopolymer resin and then curing with ultraviolet light. This completes the process for the case of the optically reflective layer, and the material is ready to be laminated or applied in other ways to the surface required. For the case where one begins with a plastic substrate coated with an optically black layer, apertures are formed in this layer by exposing this layer through the lens array to short pulses of intense coherent radiation. Once apertures have been formed, an optically reflective material can be coated on the black layer or the film can be laminated to a reflective film. This example is illustrated in FIG. 15.

Example 7

Plastic web stock of approximately 1 sq m in size was coated with a photopolymer resin material. Impressions were formed in this material of approximately 20 microns diameter by pressing a stamper into the resin. The photopolymer resin was then cured by exposure to ultraviolet radiation and the cured part removed from the stamper. Release agents were applied to the piece which was then ready to be used as a sieve. This example is illustrated in FIG. 16.

Example 8

Plastic web stock with a reflective aluminized layer on one side was coated with a photopolymer resin material on the other side. Microlenses were then formed in the photopolymer resin and the article was cured with ultraviolet light. The lens array was then illuminated with intense radiation and apertures were formed in the reflective layer. This example is illustrated in FIG. 17.

Example 9

Plastic web stock transparent to ultraviolet radiation was coated with a photopolymer resin and placed in contact with a master that comprises a sheet of plastic of approximately 1m sq in area and containing microstructures formed in negative working photoresist. For this step, a release agent may be used to allow separation of the master and stamper, and silicone and related compounds have been found to be effective for this. The master and stamper were pressed together and then the photopolymer resin was cured by exposure to ultraviolet radiation through the plastic web stock. The master and stamper were separated and then the stamper was re-exposed to 3× the dosage of ultraviolet radiation that is used to cure the photopolymer. The stamper was then used as is to replicate over 100 parts without any observable change in the fidelity of the replication. This example is illustrated in FIG. 19.

Example 10

Photocurable polymer resin was coated on one side of plastic web stock which was also coated with an optically black carbon based layer on the opposite side. Microlenses of approximately 20 microns in diameter were replicated in the photopolymer and these shapes were then cured using ultraviolet radiation. The web stock was then laminated to a sheet of polycarbonate plastic for mechanical stability. Pieces of this material were then cut and used to test the location and profile of a YAG laser operating in the infrared region with beam pulses of approximately 250 mJ. This example is illustrated by FIG. 21.

Example 11

Plastic stock was lapped with diamond lapping film to produce an original pattern of grooves and ridges. A replication process was then employed to produce multiple copies of this original pattern. This example is illustrated in FIG. 24.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A light management film for a Liquid Crystal Display (LCD) comprising:
   an optically transparent substrate;
   an array of microstructures on a first side of the substrate; and
   an optically reflective layer, including apertures therein, the optically reflective layer being located on a second side of the substrate opposite the first side wherein an optically reflective surface of the optically reflective layer is uncoated facing an illumination source for the LCD.

2. A video display comprising:
an image display configured to provide an image thereon for transmission to a viewer beyond the video display; and
a light management film between the image display and the viewer, the light management film comprising:
an optically transparent substrate;
an array of microstructures on a first side of the substrate; and
an optically reflective layer, including apertures therein, the optically reflective layer being located on a second side of the substrate opposite the first side wherein an optically reflective surface of the optically reflective layer is uncoated facing an illumination source of the video display.

* * * * *